(12) United States Patent
Brauer et al.

(10) Patent No.: US 9,796,240 B2
(45) Date of Patent: Oct. 24, 2017

(54) ENGINE OFF VAPOR COMPRESSION ADSORPTION CYCLE

(71) Applicant: Caterpillar Inc., Peoria, IL (US)

(72) Inventors: Jason Brauer, West Peoria, IL (US); Kory K. Leesman, Hartsburg, IL (US)

(73) Assignee: Caterpillar Inc., Peoria, IL (US)

( * ) Notice: Subject to any disclaimer, the term of this patent is extended or adjusted under 35 U.S.C. 154(b) by 173 days.

(21) Appl. No.: 14/825,068

(22) Filed: Aug. 12, 2015

(65) Prior Publication Data

US 2017/0045276 A1 Feb. 16, 2017

(51) Int. Cl.
| | |
|---|---|
| B60H 1/00 | (2006.01) |
| F25B 17/08 | (2006.01) |
| F25B 25/02 | (2006.01) |
| F25B 41/04 | (2006.01) |
| F25B 45/00 | (2006.01) |
| F25B 49/02 | (2006.01) |

(52) U.S. Cl.
CPC ............ B60H 1/005 (2013.01); F25B 17/08 (2013.01); F25B 25/02 (2013.01); F25B 41/04 (2013.01); F25B 45/00 (2013.01); F25B 49/02 (2013.01); *F25B 2600/2523* (2013.01)

(58) Field of Classification Search
CPC .......... B60H 1/005; F25B 17/08; F25B 25/02; F25B 45/00; F25B 2600/2523
See application file for complete search history.

(56) References Cited

U.S. PATENT DOCUMENTS

| | | | |
|---|---|---|---|
| 4,610,148 A * | 9/1986 | Shelton | F25B 17/083 62/106 |
| 5,142,884 A | 9/1992 | Scaringe et al. | |
| 5,163,302 A | 11/1992 | Swadner et al. | |
| 6,314,744 B1 | 11/2001 | Ogawa | |
| 6,807,820 B2 | 10/2004 | Aikawa et al. | |
| 7,266,967 B2 * | 9/2007 | Inoue | B60H 1/3201 62/101 |
| 7,360,375 B2 | 4/2008 | Mola et al. | |
| 2004/0231833 A1 * | 11/2004 | Wang | B60H 1/005 165/202 |
| 2005/0016193 A1 | 1/2005 | Tarasinski et al. | |

(Continued)

FOREIGN PATENT DOCUMENTS

| | | |
|---|---|---|
| DE | 102010056414 A1 | 6/2012 |
| JP | 6361626 A | 3/1988 |

(Continued)

*Primary Examiner* — Emmanuel Duke

(57) ABSTRACT

A cooling system is disclosed so that an operator cabin can be cooled even if the engine is off. An accumulator can be used to store high-pressure refrigerant until its release. When the compressor is off, the accumulator can release the high pressure refrigerant through the pressure reducer and to the evaporator where heat in the operator cabin can be removed by the refrigerant. An absorption bed with activated carbon can be used to adsorb the refrigerant from the evaporator in order to create a pressure gradient in A/C system. The refrigerant in the accumulator can also be used to subcool a refrigerant in the condenser through a heat exchanger. This allows the operator cabin to be cooled faster up on engine start up. The adsorption bed can also be used to create a pressure gradient in the cooling system.

14 Claims, 5 Drawing Sheets

(56) References Cited

U.S. PATENT DOCUMENTS

2009/0314023 A1* 12/2009 Labaste Mauhe ..... B60H 1/005
                                                     62/335
2010/0192602 A1   8/2010 Brooks et al.

FOREIGN PATENT DOCUMENTS

WO    94/08185 A1    4/1994
WO    2012/085716 A1 6/2012

* cited by examiner

ENGINE OFF VAPOR COMPRESSION ADSORPTION CYCLE

TECHNICAL FIELD

This disclosure relates generally to cooling of a vehicle and, more particularly, to cooling of the vehicle when the engine is off.

BACKGROUND

Vehicles, such as earthmovers are operated in harsh environments including hot climates. In order to combat the heat, operator cabins of vehicles are often cooled using an air-conditioning (A/C) system. However, in order to operate the air-conditioning system, the engine must be on in order to provide power to the various components of air-conditioning system. For example, compressors are driven by a belt that is coupled to the engine while the engine is operating. Vehicle batteries may be used to operate the air-conditioning system when engine is off, however, this may lead to a battery drain, which may prevent the vehicle from starting.

U.S. Pat. No. 7,266,967 discloses an air-conditioning system for an automotive vehicle having a water cooling type internal combustion engine that includes a first refrigerator, and an adsorption type refrigerator having adsorbent. The first refrigerator controls temperature of air to be blown into a passenger compartment of the vehicle. The adsorbent generates adsorption heat when the adsorbent adsorbs the medium, and desorbs the adsorbed medium when the adsorbent is heated by coolant water in the internal combustion engine. The air to be blown into the passenger compartment is heated by the adsorption heat of the adsorbent, is cooled by the evaporation patent heat of the medium. However, this system does not maintain prolonged cooling in the operator's cabin when engine is off

SUMMARY

In one aspect, the disclosure includes a cooling system for a vehicle having a compressor configured to compress a refrigerant in a gas state, a condenser configured to remove heat from the refrigerant to convert the refrigerant from the gas state to a liquid state, an accumulator configured to store refrigerant from the condenser at a high pressure, an evaporator configured to remove heat from an operator cabin with the refrigerant, a pressure reducer configured to decrease refrigerant pressure and to meter an amount of refrigerant that is received by the evaporator, and an adsorption bed having an adsorption material that adsorbs refrigerant when the compressor is off, wherein when the compressor is off, the accumulator releases the stored high pressure condensed refrigerant to cool the operator cabin.

In another aspect, the disclosure includes a cooling system for a vehicle having a compressor configured to compresses a refrigerant in a gas state, a condenser configured to remove heat from the refrigerant to convert the refrigerant from the gas state to a liquid state, an accumulator configured to store refrigerant from the condenser at a high pressure, an evaporator configured to remove heat from an operator cabin with the refrigerant, a heat exchanger coupled to the condenser and configured to remove heat from the refrigerant in the condenser, a first pressure reducer configured to decrease refrigerant pressure and to meter an amount of refrigerant that is received by the heat exchanger from the accumulator, and an adsorption bed having an adsorption material that adsorbs refrigerant from the heat exchanger.

In another aspect of the disclosure, a method of cooling a vehicle is provided and includes charging an accumulator with a high pressure refrigerant, releasing the high pressure refrigerant from the accumulator, reducing the high pressure refrigerant to a lower pressure refrigerant with a pressure reducer, metering the lower pressure refrigerant with the pressure reducer, adsorbing the refrigerant with the adsorption bed, and creating a pressure gradient with an adsorption bed.

DETAILED DESCRIPTION

Figure 1:
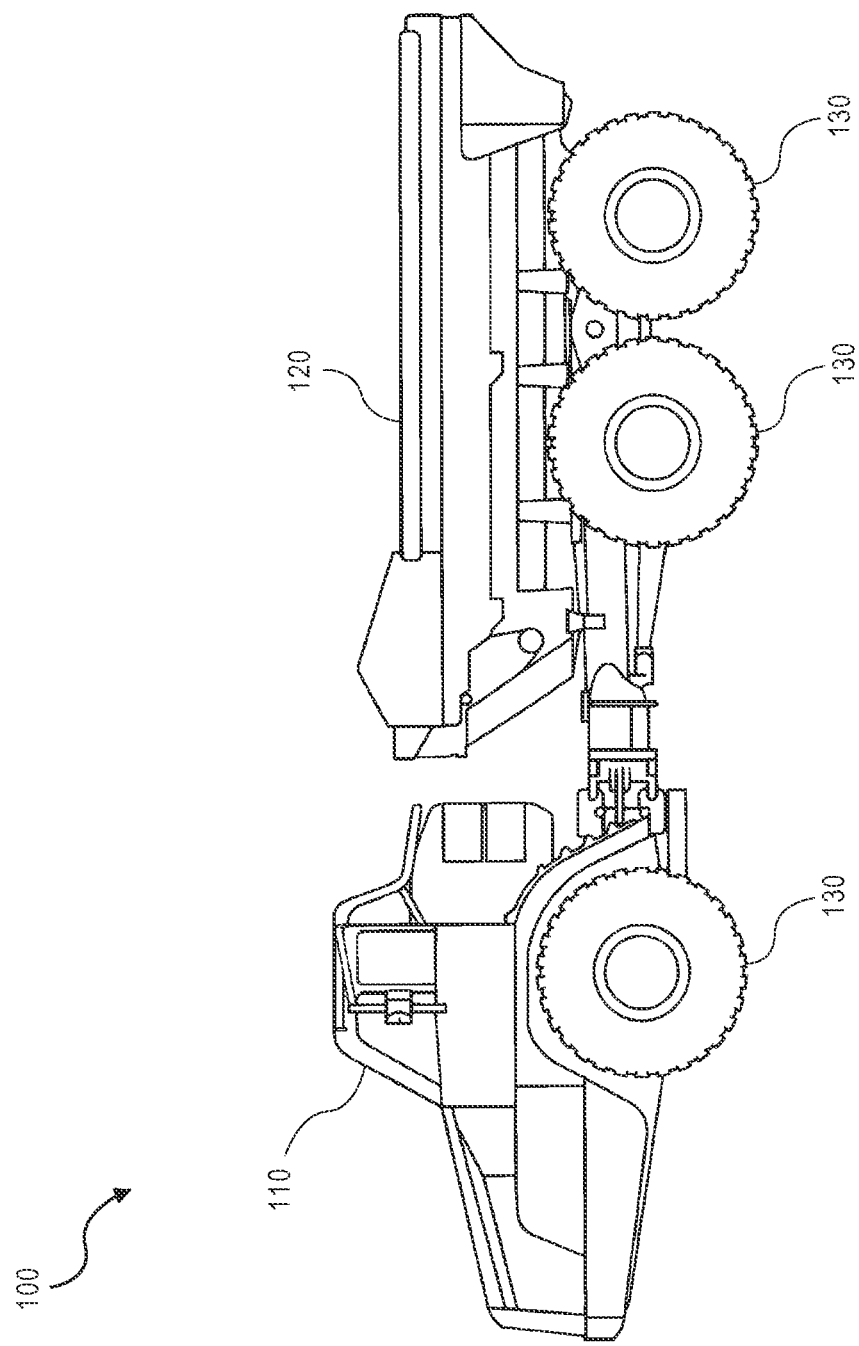
FIG. 1 illustrates a vehicle that includes an A/C system according to an aspect of the disclosure.

Now referring to the drawings, wherein like reference numbers refer to like elements, there is illustrated a vehicle 100 powered by an internal combustion engine adapted to combust a fuel to release the chemical energy therein and convert that energy to mechanical power. The vehicle can be an "over-the-road" vehicle such as a truck used in transportation or may be any other type of machine that performs some type of operation associated with an industry such as mining, construction, farming, transportation, or any other industry known in the art. For example, the vehicle may be an off-highway truck, earth-moving machine, such as a wheel loader, excavator, dump truck, backhoe, motor grader, material handler or the like.

FIG. 1 illustrates a vehicle that includes an A/C system according to an aspect of the disclosure. An articulated vehicle 100, such as an articulated truck, that includes an operator cabin 110 that may include a truck vehicle bed 120 is illustrated. The operator cabin 110 provides an enclosed and temperature controlled environment for the operator and protects the operator from the surrounding elements. An air-conditioning system 200 can be used to maintain a cool temperature in the operator cabin 110 when the vehicle 100 is operated in a hot climate. Both the operator cabin 110 and vehicle bed 120 rest upon at least one ground-engaging member 130. The vehicle 100 may further include an engine, a battery system, a frame, axles, a differential, and a hydraulic system. The engine may include a transmission to transmit rotational power to move the vehicle 100. Further, the engine may provide power to operate the air-conditioning system 200.

Figure 2:
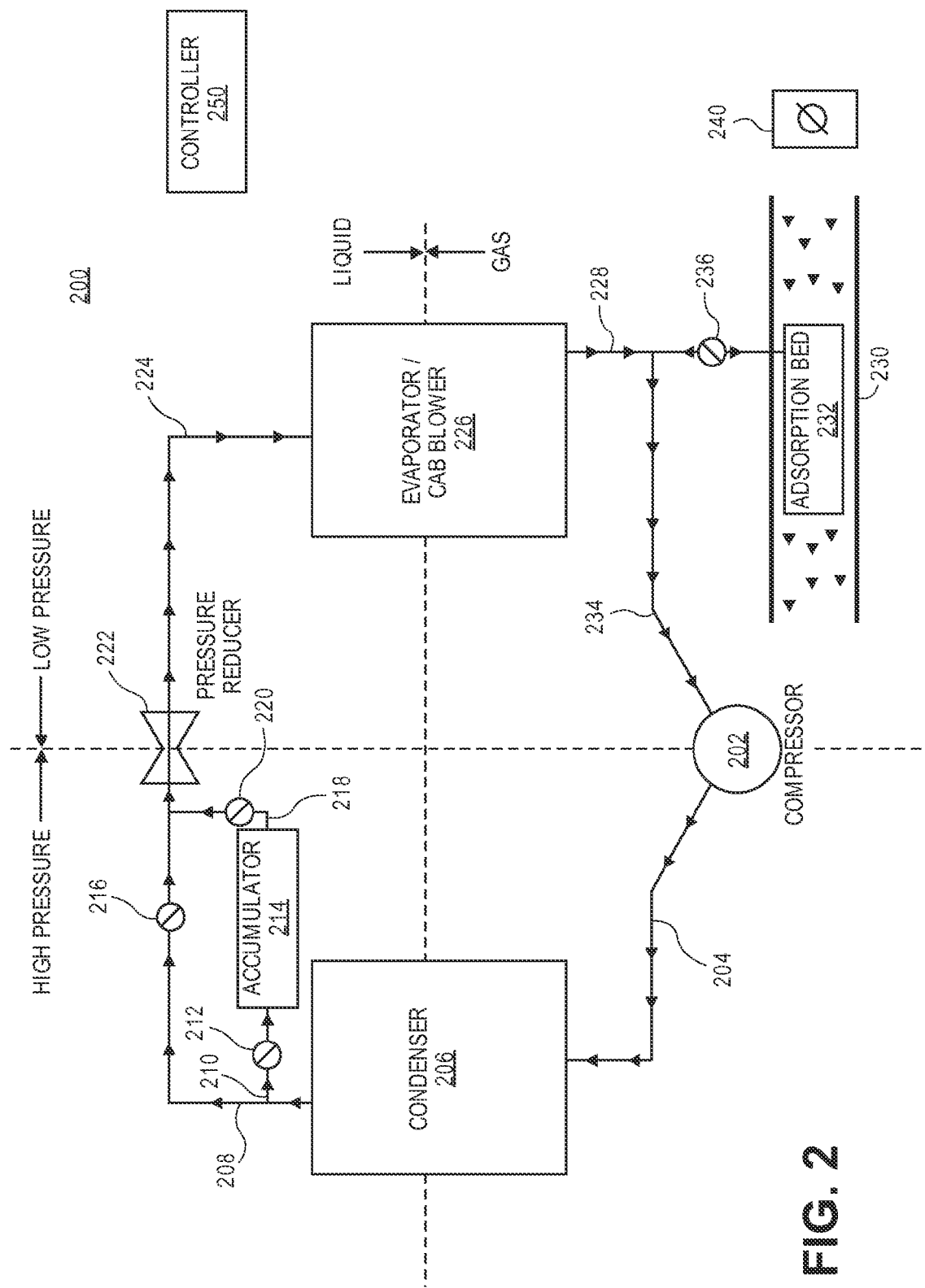
FIG. 2 is a block diagram of components of an A/C system that can be used for the vehicle of FIG. 1 according to an aspect of the disclosure.

FIG. 2 is a block diagram of components of an A/C system 200 that can be used for the vehicle of FIG. 1 according to an aspect of the disclosure. The A/C system 200 may include components such as a compressor 202, a condenser 206, an accumulator 214, a pressure reducer 222, an evaporator 226, an adsorption bed 230, a refrigerant and various valves. The refrigerant can be any refrigerant including R134, $CO_2$, R1234yf, R152a, and the like.

The compressor 202 can be powered via the engine, a battery (not shown) or other electrical source (solar panel, etc.) and receives low pressure refrigerant vapor from the evaporator 226 via lines 228, 234. The compressor 202 can be any type of compressor including electric, in-line design, v-type, variable displacement and the like. The compressor 202 includes a suction line 234 (low pressure, refrigerant vapor) and a discharge line 204 (high-pressure, refrigerant vapor). A piston in the compressor 202 compresses or pressurizes the refrigerant to a high pressure refrigerant. As the pressure of the refrigerant vapor increases so does the refrigerant vapor's temperature. The high pressured and hot refrigerant vapor leaves the compressor 202, via the discharge line 204, to the condenser 206.

In the condenser 206, the high pressured and hot refrigerant vapor is received via the discharge line 204. Heat is removed from the refrigerant due to an airstream moving through the condenser. The air is moved through condenser while the vehicle is moving or by the radiator cooling fan when the vehicle is stationary. As the high pressured refrigerant vapor is cooled the refrigerant to condense or return to a liquid state including being 100% saturated liquid refrigerant. In the liquid state, the refrigerant can absorb much more heat than when it is in the gas or vapor state.

Still under high pressure, but in a saturated liquid state, the refrigerant leaves the condenser 206 via line 208 to a valve 216. In addition to or alternatively, the refrigerant leaves the condenser 206 via line 208 then moves to line 210 and then to valve 212 that leads to an accumulator 214. The valve 216 in the open state allows refrigerant to proceed to pressure reducer 222, where the refrigerant flow is further regulated before it travels to evaporator 226. In the closed state, the valve 216 prevents the refrigerant for proceeding to pressure reducer 222. The valve 216 may be closed so that refrigerant moves into the accumulator to charge it as explained below.

In one aspect of the disclosure, refrigerant from the condenser 206 may enter the accumulator 214, where it is stored at high-pressure and in the liquid state until needed. For example, when the vehicle 100 is off When the vehicle is off, and the compressor is also off, some pressure remains in the A/C system 200 for a very short time and thus, the A/C system 200 is unable to adequately cool the operator cabin. With the refrigerant stored at high-pressure in the accumulator 214, accumulator valve 220 may be opened to allow the highly pressurized refrigerant to travel via line 218, then to line 208 and then to the pressure reducer 222.

The pressure reducer 222 is configured to control the amount refrigerant flowing therethrough via line 224 to the evaporator 226. One side (condenser side) of the pressure reducer 222 has a higher pressure than the second side (evaporator side). Thus, the pressure reducer 222 not only controls the amount of refrigerant flowing therethrough but will also reduce the refrigerant from a high-pressure refrigerant to a lower pressure refrigerant.

At the evaporator 226, the A/C system 200 is ready to cool the operator cabin. The blower may be separate or be included with the evaporator. The evaporator is configured to act like a heat exchanger that is responsible for absorbing heat such as heat in the operator cabin so that the operator cabin becomes cooler. This is due to the fact that heat flows from a high temperature to a lower temperature. The blower circulates the hot air in the operator cabin to the evaporator 226, which then returning cooler air back to the operator cabin. The evaporator 226 will continue to absorb heat from the operator cabin until the liquid refrigerant starts to vaporize or turn into the gas state. The vaporized refrigerant returns to the compressor 202 via line 228 and line 234. The A/C system 200 cooling process can repeat until the A/C system is shut off The valves, pressure reducer 222 and other components of the A/C system described herein may be controlled by a controller 250. The controller 250 may be any type of controller including a microcontroller, a processor, an ASIC or an FPGA or a controller (electronic control unit) in the vehicle 100 or by mechanical means. The mechanical means may include the valves, and pressure reducer and other components to be mechanically operated by hand or having mechanical components that open and close depending on the operating conditions. The operating conditions include when a certain predetermined pressure or predetermined temperature is exceeded. In one aspect of the disclosure, the valves and the pressure reducer may only allow the refrigerant to flow in one direction. Alternatively, the valves and the pressure reducer may allow refrigerant to flow in two directions. A pressure activated valve can be configured to open, for example, at 100 psi, then when the valve receives a refrigerant having a pressure of 100 p.s.i. or greater the valve will open and then when the received refrigerant pressure is less than 100 p.s.i. the valve is closed. This similarly occurs with regards to temperature such as if the pressure reducer 222 is configured to open partially at, for example, one temperature (70° C.) and they gradually opens fully when the temperature reaches a different temperature (85° C.) to cool the operator cabin. This allows pressure reducer 222 to open and close depending on the determined temperature without interaction by the operator.

When the engine of the vehicle is turned off, the compressor 202 may no longer function as power to the compressor may also be turned off Thus, if the operator remains in the operator cabin (operated in a hot environment) for 5 to 10 minutes, the temperature in the operator cabin may become intolerable. At this point, since the compressor 202 is off and no high-pressure is produced, refrigerant will no longer circulate in the A/C system 200 because the system has equalized in pressure.

As noted above, during normal operations, accumulator 214 can store refrigerant under high pressure and does not release the refrigerant due to accumulator valve 220 being closed. However, should the operator desires for the operator cabin to be cooled when the engine in the compressor is off, the controller 250 or the operator (manually) control various valves in order to restore cooling for a certain amount of time. At this point, the accumulator valve 220 may be opened so that high pressured refrigerant in the accumulator 214 can be released to the pressure reducer 222 via line 218 and then to the line 208. The high-pressure refrigerant will pass through the pressure reducer 222, which reduces the high-pressure refrigerant to a lower pressure refrigerant that then travels to the evaporator 226 via line 224. Because the compressor 202 is off, refrigerant from the evaporator 226 will start to accumulate and the pressure will increase in the line 228 and the line 224 and thus refrigerant movement is impeded. In order to relieve the pressure, a valve 236 is opened via a controller 250 or the operator manually so that vapor refrigerant can flow into adsorption bed 230, which includes an adsorbent material 232, such as an activated carbon, zeolite, silica gel, activated alumina, and the like that will adsorb refrigerant thereon. This adsorption of the refrigerant will remove refrigerant from the evaporator 226 and thus, creates low pressure (pressure gradient), which allows for high pressure refrigerant from the accumulator 214 to continue to flow to the evaporator 226 where the refrigerant absorbs the heat from the operator cabin and eventually turned from liquid refrigerant to a vapor refrigerant that is adsorbed in the adsorption bed 230. Once the absorbent material 232 in the adsorption bed 230 is saturated, the pressure in the evaporator 226 and line 228 start to increase, which can prevent further discharge of the high-pressure refrigerant from accumulator 214. The amount adsorbent material 232 should be sufficient in order for the accumulator 214 to release most, if not all, of the stored high-pressure refrigerant. Thus, the process of storing refrigerant under high-pressure in the accumulator and later adsorbed in the adsorption bed 230 should allow the operator to be cooled in the operator cabin for an extended period time. The amount of the extended period of time for cooling the operator cabin after the engine and the compressor is turned off may be related to the size of the accumulator 214 (storing larger amounts refrigerant) and the amount of adsorbent material 232 stored in the adsorption bed 230. Thus the extended period time for cooling may be between one minute to 30 minutes including between five minutes to 15 minutes.

Once the adsorption bed 230 is saturated by refrigerant, and the vehicle is turned back on, the exhaust valve 240 may be opened to allow waste heat from the vehicle to flow pass the adsorption bed to desorb the refrigerant from the adsorbent material. The desorbed refrigerant in the adsorption bed 230 may enter line 228, through valve 236 then to line 234 which ultimately leads to the compressor 202. The returned refrigerant allows for the accumulator 214 to be recharged as previously explained. Once the entire refrigerant is desorbed from the adsorption bed 230, exhaust valve 240 may be closed and normal operation of the A/C system can occur.

Figure 3:
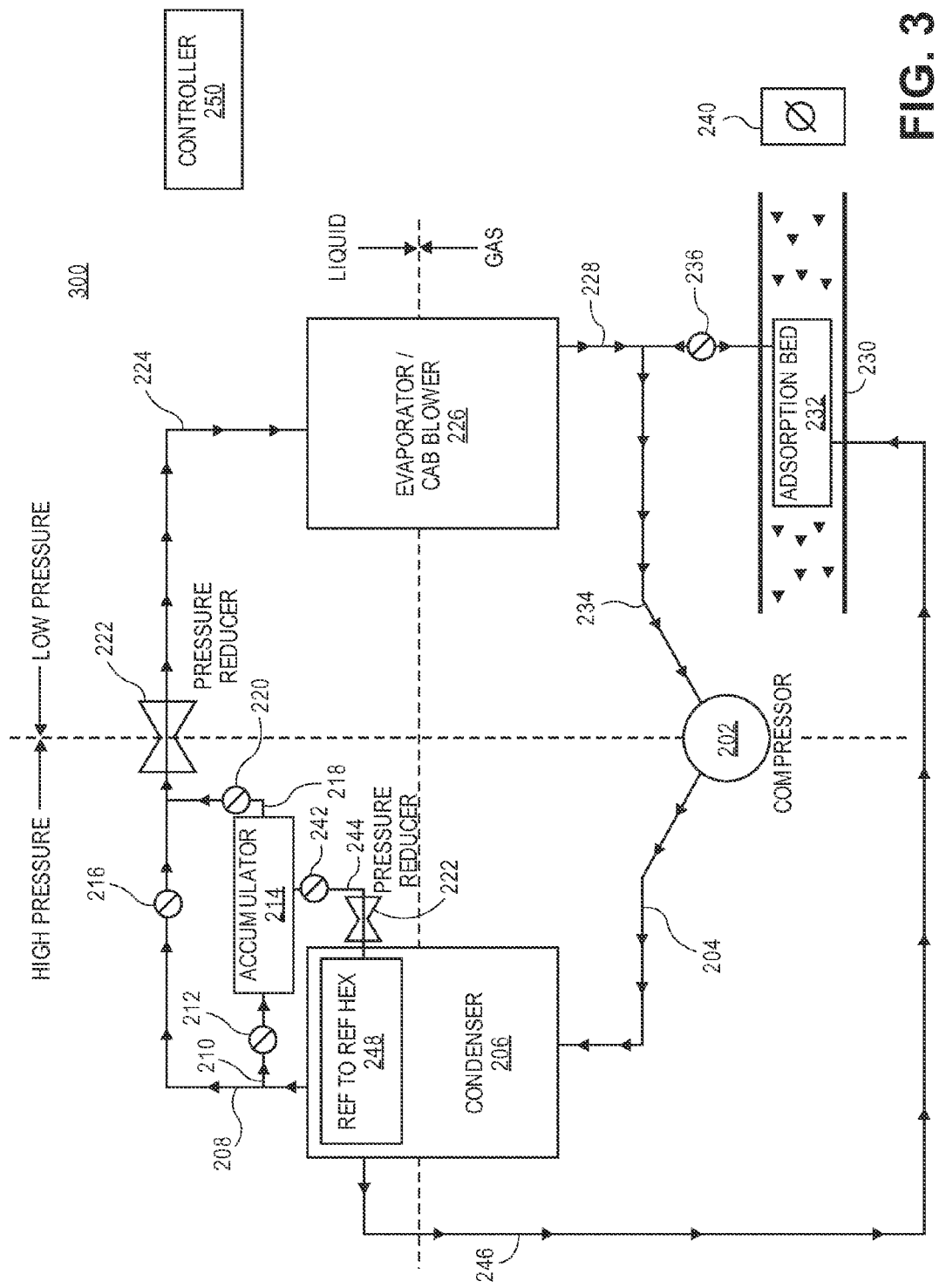
FIG. 3 is a block diagram of components of an A/C system that can be used for the vehicle of FIG. 1 according to another aspect of the disclosure.

In another aspect of the disclosure, refrigerant in the condenser can be further cooled through a subcool boost process. The subcool boost process allows liquid refrigerant to be cooled even further than under normal conditions. This allows the liquid refrigerant to absorb more heat as the subcooled refrigerant will have an increase heat of vaporization. The subcool process can be used after the engine is shut off for a period of time and the operator cabin is relatively hot. Thus, it is desired to quickly cool the operator cabin to a comfortable level. FIG. 3 is a block diagram of components of an A/C system 300 that can be used for the vehicle of FIG. 1 according to another aspect of the disclosure. Most of the components shown in FIG. 2 are also maintained in FIG. 3 and thus they are not discussed in detail. Additional components include a second pressure reducer 222 and a heat exchanger 248 that may be part of the condenser 206 or simply be coupled thereto.

As previously noted, hot and high pressured vapor refrigerant travels from the compressor 202 to the condenser 206 via line 204. At the condenser 206, the vapor refrigerant is condensed or cooled to a liquid state (while still under high pressure) and will have a certain amount of heat of vaporization (ability to absorb a certain amount of heat). In order for the refrigerant to absorb more heat, it can be further cooled in order to increase the heat of vaporization. The accumulator 214 can be charged or previously charged with a liquid refrigerant under high-pressure during the normal A/C system operation and stored until it is released. Refrigerant can be released from accumulator 214 via valve 242 to a second pressure reducer 222 via line 244. The second pressure reducer 222 can reduce the high pressure of the refrigerant in the accumulator 214 to a lower pressure before it travels to the heat exchanger 248. At the heat exchanger 248, the refrigerant from accumulator 214 can be used to further cool the refrigerant by removing the heat from the refrigerant in the condenser. The adsorption bed 230 can also be used to maintain a pressure gradient on one side of the heat exchanger by adsorbing the refrigerant from the heat exchanger via the adsorbent material. The refrigerant from the heat exchanger 248 may be sent via line 246 to the adsorption bed 230. Valve 240 can be closed to prevent waste heat from entering during this process.

Once the adsorption bed 230 is saturated with refrigerant, the desorption process can proceed as previously explained. Valve 242 can be closed to prevent further release of refrigerant from the accumulator. Valve 240 can be opened to allow waste heat to pass through the adsorption bed 230 and to allow the desorbed refrigerant to enter the compressor via valve 236 and lines 228, 234. Further, the accumulator 214 is recharged with high pressured refrigerant for later use.

Figure 4:
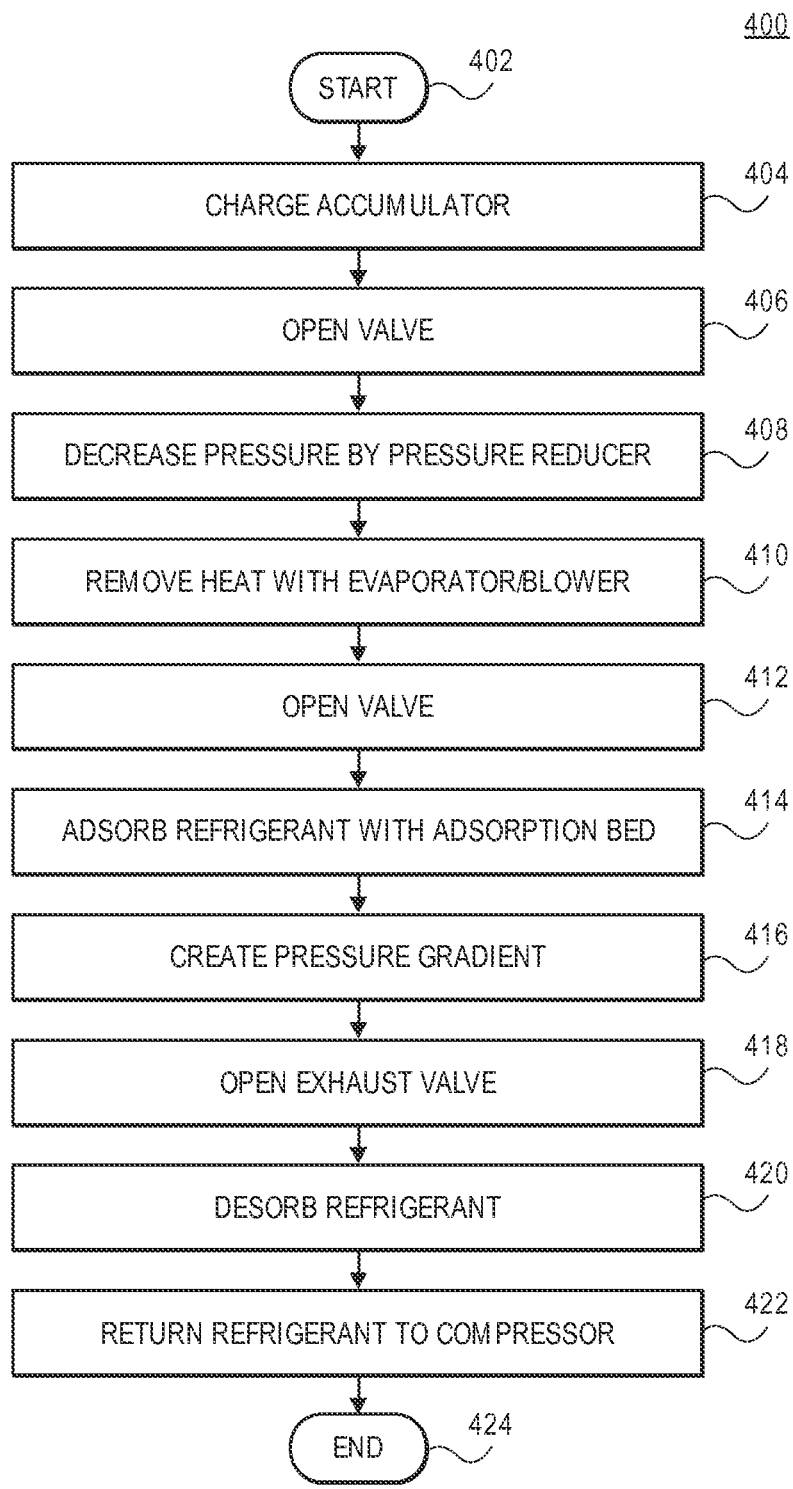
FIG. 4 illustrates a method of cooling the vehicle according to an aspect of the disclosure.

FIG. 4 illustrates a method of cooling 400 the vehicle according to an aspect of the disclosure. The method of cooling 400 allows for the operator cabin 110 to be cooled even when the engine is off or when the compressor is off (or fails). This allows the operator cabin 110 to be cooled for a certain amount of time depending on the environment of the vehicle. The method of cooling 400 starts at step 402 when the engine or the compressor is off. At step 404, the accumulator 214 is charged or previously charged with high-pressure refrigerant from the condenser 206. The accumulator 214 is configured to hold the refrigerant at high-pressure until it is released. At step 406, valves such as accumulator valve 220, and valve 236 can be opened manually, automatically, or by the controller 250 to allow the high pressure refrigerant to leave the accumulator 214 and travel to the pressure reducer 222 and to allow refrigerant to travel to the adsorption bed 230. At step 408, once the valves are opened a pressure gradient is created in order for the refrigerant to travel from the accumulator 214. At step 410, the pressure reducer 222 reduces the pressure of the refrigerant from accumulator 214 to a lower pressure and allows the refrigerant to travel to the evaporator 226 via line 224. At step 412, the evaporator/blower 226 will remove heat from the operator cabin 110 with the refrigerant. As the refrigerant absorbs the heat, it turns from a liquid state to a vapor or gas state. However, since the compressor 202 is off, valve 236 was opened so that refrigerant from the evaporator 226 can travel to the adsorption bed 230 via line 228. At step 414, the adsorbent material 232 adsorbs the refrigerant. Once the accumulator 214 has released its entire refrigerant or the adsorbent material 232 is fully saturated, the refrigerant must be the desorbed and recirculated in the A/C system 200. At step 416, the exhaust valve 240 is opened to allow waste heat from the engine (when started) to pass across the adsorption bed 230 and thus, vaporize or desorb the refrigerant from the adsorbent material 232 at step 418. At step 420, the vaporized or desorbed refrigerant returns to the compressor 202 for further use by the A/C system. At step 422 the process ends.

Figure 5:
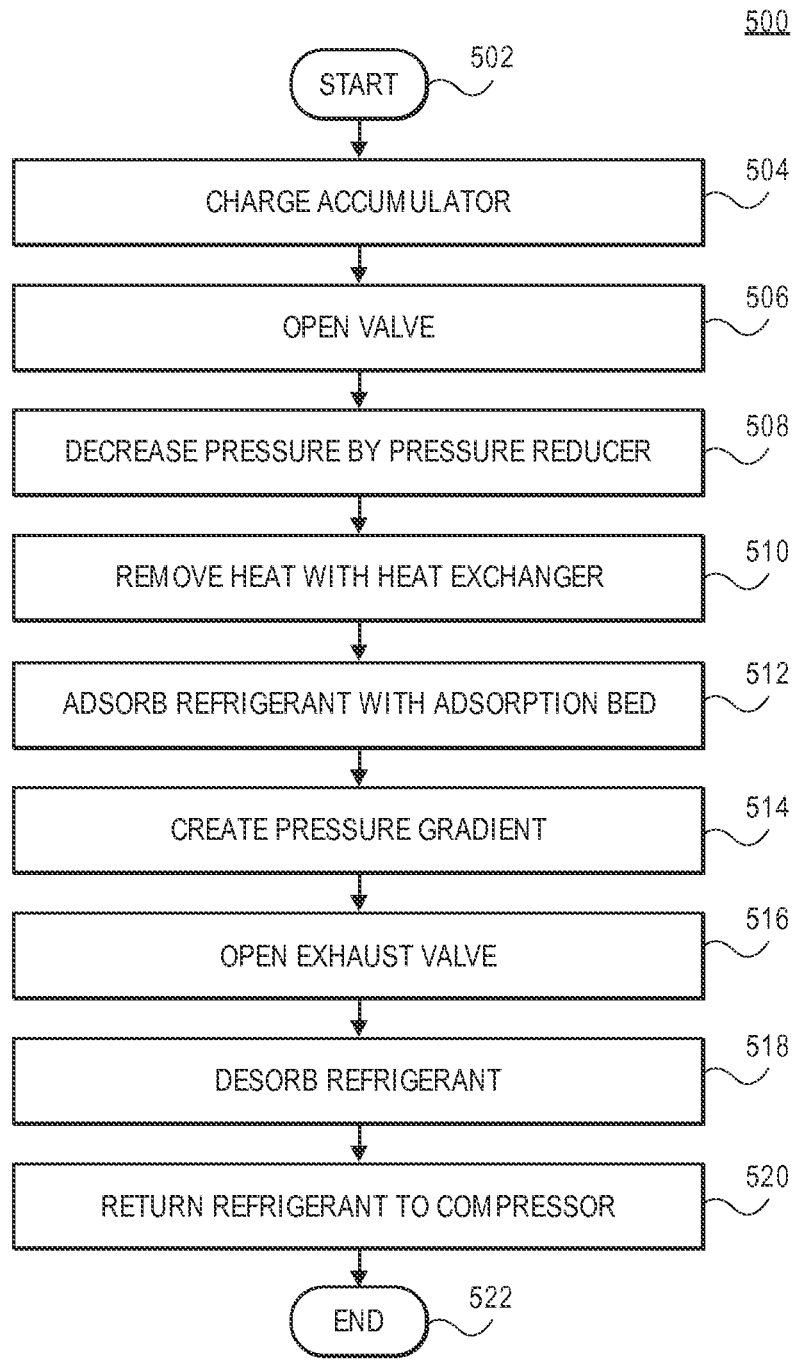
FIG. 5 illustrates a method of cooling 500 the vehicle according to another aspect of the disclosure.

FIG. 5 illustrates a method of cooling the vehicle 500 according to another aspect of the disclosure. The method of cooling 500 allows for the operator cabin 110 to be rapidly cooled when the engine starts. The method of cooling 500 starts at step 502 when the engine or the compressor is turned back on. At step 504, the accumulator 214 is charged or previously charged with the high-pressure refrigerant from the condenser 206. The accumulator 214 is configured to hold the refrigerant at high-pressure until it is released. At step 506, valve2 242 and 226 can be opened manually, automatically, or by the controller 250 to allow the high pressure refrigerant to leave the accumulator 214 and travel to the pressure reducer 222 and the refrigerant from the evaporator to travel to the adsorption bed. At step 508, once the valves are opened a pressure gradient is created in order for the refrigerant to travel from the accumulator 214. At step 510, the pressure reducer 222 reduces the pressure of the refrigerant from accumulator to a lower pressure and allows the refrigerant to travel to the heat exchanger 248 via line 244. At step 512, the heat exchanger 248 will remove heat from the refrigerant in the condenser 206 thereby, subcooling the refrigerant. This increases the refrigerant's heat of vaporization and allows more heat to be absorbed at the evaporator 226. As the refrigerant absorbs the heat, it turns from a liquid state to a vapor or gas state. At step 514, the refrigerant from the heat exchanger 248 travels to the adsorption bed 230 via line 246 so that the adsorbent material 232 adsorbs the refrigerant. Once the accumulator 214 has released its entire refrigerant or the adsorbent material 232 is fully saturated, the refrigerant must be the desorbed and recirculated in the A/C system 200. At step 516, the exhaust valve 240 is opened to allow waste heat from the engine (when started) to pass across the adsorption bed 230 and thus, vaporize or desorb the refrigerant from the adsorbent material 232 at step 518. At step 520, the vaporized or desorbed refrigerant returns to the compressor 202 for the use by the A/C system 300. At step 522 the process ends.

Thus, as disclosed herein an A/C system can be used to provide cool air to the operator cabin even when the engine and the compressor are turned off. Further, the A/C system can also provide subcooled refrigerant so that the operator cabin can cool quickly in harsh environments.

INDUSTRIAL APPLICABILITY

The present disclosure is applicable to A/C systems in a vehicle that is used to cool an operator cabin. In one aspect of the disclosure, an accumulator can be used to store high-pressure refrigerant until its release. When the compressor is off, the accumulator can release the high-pressure refrigerant through the pressure reducer and to the evaporator where heat in the operator cabin can be removed by the refrigerant. As the compressor is off, no pressure gradient is produced in A/C system and the pressure in A/C system ultimately equalizes and the accumulator cannot release the remaining refrigerant. An absorption bed with adsorbent material can be used to adsorb the refrigerant from the evaporator in order to create a pressure gradient in A/C system. Once the adsorbent material is saturated or when accumulator releases its entire refrigerant, the refrigerant needs be returned to the A/C system. By opening exhaust valve when the engine is turned on, waste heat from the engine can pass over the adsorption bed causing the refrigerant to vaporize and ultimately returned to the compressor.

In another aspect of the disclosure, the operator cabin can be quickly cooled using subcooled refrigerant. The accumulator can be charged or be recharged with high-pressure refrigerant until it is released. A heat exchanger can be coupled to the condenser in order to further cool the refrigerant in the condenser. Around the time the engine starts, the accumulator can release a high-pressure refrigerant through the pressure reducer, which is coupled to a heat exchanger. At the heat exchanger, heat from the refrigerant of the condenser is removed and absorbed by the refrigerant of the accumulator thereby subcooling the condenser refrigerant and increasing its heat of vaporization. In order to create a pressure gradient on one side of the heat exchanger, the adsorption bed can be used to adsorb the refrigerant from the heat exchanger onto the adsorbent material. Once the adsorbent material is saturated or when accumulator releases its entire refrigerant, the refrigerant needs be returned to the A/C system. By opening exhaust valve when the engine is turned on, waste heat from the engine can pass over the adsorption bed causing the refrigerant to vaporize and ultimately returned to the compressor.

We claim:

1. A cooling system for a vehicle, comprising:
   a compressor configured to compress a refrigerant in a gas state;
   a condenser configured to remove heat from the refrigerant to convert the refrigerant from the gas state to a liquid state;
   an accumulator configured to store refrigerant from the condenser at a high pressure;
   an evaporator configured to remove heat from an operator cabin with the refrigerant;
   a pressure reducer configured to decrease refrigerant pressure and to meter an amount of refrigerant that is received by the evaporator; and
   an adsorption bed having an adsorption material that adsorbs refrigerant when the compressor is off, wherein when the compressor is off, the accumulator releases the stored high pressure condensed refrigerant to cool the operator cabin.

2. The cooling system of claim 1, wherein the evaporator includes a blower that circulates air in the operator cabin.

3. The cooling system of claim 1 further comprising:
   a valve configured to allow heat from the vehicle to cause the adsorbed refrigerant to desorb from the adsorption bed; and
   a controller that controls the valve to open and close.

4. The cooling system of claim 1, wherein the adsorption material is activated carbon, zeolite, silica gel or activated alumina.

5. The cooling system of claim 3, wherein the desorbed refrigerant returns to the compressor.

6. The cooling system of claim 1, wherein the adsorption of refrigerant creates a pressure gradient in the cooling system that allows the accumulator to release the stored refrigerant.

7. A cooling system for a vehicle, comprising:
   a compressor configured to compresses a refrigerant in a gas state;
   a condenser configured to remove heat from the refrigerant to convert the refrigerant from the gas state to a liquid state;
   an accumulator configured to store refrigerant from the condenser at a high pressure;
   an evaporator configured to remove heat from an operator cabin with the refrigerant;
   a heat exchanger coupled to the condenser and configured to remove heat from the refrigerant in the condenser;
   a first pressure reducer configured to decrease refrigerant pressure and to meter an amount of refrigerant that is received by the heat exchanger from the accumulator; and
   an adsorption bed having an adsorption material that adsorbs refrigerant from the heat exchanger.

8. The cooling system of claim 7, wherein the evaporator includes a blower that circulates air in the operator cabin.

9. The cooling system of claim 7 further comprising:
   a valve configured to allow heat from the vehicle to cause the adsorbed refrigerant to desorb from the adsorption bed; and
   a controller that controls the valve to open and close.

10. The cooling system of claim 9, wherein the desorbed refrigerant returns to the compressor.

11. The cooling system of claim 7, wherein the adsorption material is activated carbon, zeolite, silica gel, or activated alumina.

12. The cooling system of claim 7, wherein the adsorption of refrigerant creates a pressure gradient in the cooling system that allows the accumulator to release the stored refrigerant.

13. The cooling system of claim 7, wherein the heat exchanger absorbs heat with the refrigerant from the accumulator.

14. The cooling system of claim 7 further comprising a second pressure reducer configured to decrease refrigerant pressure and to meter an amount of refrigerant that is received by the evaporator.

\* \* \* \* \*